US008984868B2

(12) United States Patent
Patel et al.

(10) Patent No.: US 8,984,868 B2
(45) Date of Patent: Mar. 24, 2015

(54) EXHAUST SYSTEM HAVING MULTIPLE DOSERS

(75) Inventors: Ajay Patel, Joliet, IL (US); Pradeep K. Ganesan, Chicago, IL (US)

(73) Assignee: Electro-Motive Diesel, Inc., LaGrange, IL (US)

(*) Notice: Subject to any disclaimer, the term of this patent is extended or adjusted under 35 U.S.C. 154(b) by 221 days.

(21) Appl. No.: 13/465,584

(22) Filed: May 7, 2012

(65) Prior Publication Data

US 2013/0291519 A1    Nov. 7, 2013

(51) Int. Cl.
| | |
|---|---|
| F01N 3/00 | (2006.01) |
| F01N 3/02 | (2006.01) |
| F01N 3/10 | (2006.01) |
| F01N 3/20 | (2006.01) |
| B01F 3/02 | (2006.01) |
| B01F 5/04 | (2006.01) |
| B01F 15/06 | (2006.01) |
| F01N 3/025 | (2006.01) |
| F01N 3/36 | (2006.01) |
| F01N 3/28 | (2006.01) |

(52) U.S. Cl.
CPC ............... *B01F 5/0463* (2013.01); *B01F 3/02* (2013.01); *B01F 15/063* (2013.01); *B01F 2015/062* (2013.01); *F01N 3/0253* (2013.01); *F01N 3/103* (2013.01); *F01N 3/2033* (2013.01); *F01N 3/2892* (2013.01); *F01N 3/36* (2013.01); *F01N 2610/03* (2013.01); *F01N 2610/1453* (2013.01); *F01N 2610/146* (2013.01); *F01N 2900/1411* (2013.01); *Y02T 10/26* (2013.01)
USPC ................... 60/295; 60/287; 60/288; 60/277; 60/317; 60/286

(58) Field of Classification Search
USPC ........... 60/286, 295, 297, 299, 300, 301, 277, 60/317, 324
See application file for complete search history.

(56) References Cited

U.S. PATENT DOCUMENTS

| | | | |
|---|---|---|---|
| 7,210,286 B2 | 5/2007 | Sun et al. | |
| 7,587,893 B2 | 9/2009 | Winsor | |
| 7,788,911 B2 | 9/2010 | Zhang et al. | |
| 2003/0109047 A1* | 6/2003 | Valentine | ........................ 436/55 |
| 2009/0158707 A1 | 6/2009 | Baird et al. | |
| 2010/0031639 A1 | 2/2010 | Kwon | |
| 2010/0050634 A1 | 3/2010 | Yager | |
| 2010/0242440 A1 | 9/2010 | Garimella et al. | |
| 2010/0300074 A1 | 12/2010 | Mullins et al. | |
| 2011/0011060 A1* | 1/2011 | McCarthy, Jr. | ................. 60/274 |
| 2011/0047973 A1 | 3/2011 | Wilhelm et al. | |
| 2011/0162350 A1 | 7/2011 | Ponnathpur | |
| 2011/0265459 A1 | 11/2011 | Mupparapu et al. | |

FOREIGN PATENT DOCUMENTS

WO    WO 94/26659    * 11/1994

* cited by examiner

*Primary Examiner* — Audrey K Bradley
*Assistant Examiner* — Dapinder Singh
(74) *Attorney, Agent, or Firm* — Finnegan, Henderson, Farabow, Garrett & Dunner, LLP

(57) ABSTRACT

An exhaust system for a machine is disclosed. The exhaust system may have a diffuser configured to receive exhaust from an engine. The exhaust system may further have a plurality of dosers associated with the diffuser and configured to inject fuel into the diffuser. The exhaust system may also have a controller configured to selectively control an amount of fuel injected by each of the plurality of dosers based on a velocity of the exhaust adjacent to each doser. In addition, the exhaust system may have an after-treatment component fluidly connected downstream of the diffuser and configured to heat the exhaust by oxidizing the injected fuel.

20 Claims, 6 Drawing Sheets

EXHAUST SYSTEM HAVING MULTIPLE DOSERS

TECHNICAL FIELD

The present disclosure relates generally to an exhaust system and, more particularly, to an exhaust system having multiple dosers.

BACKGROUND

Internal combustion engines generate exhaust as a by-product of fuel combustion within the engines. Engine exhaust contains, among other things, unburnt fuel, particulate matter such as soot, and harmful gases such as carbon monoxide or nitrous oxide. To comply with regulatory emissions control requirements, engine exhaust must be cleaned before discharge into the atmosphere.

Engines typically include after-treatment devices that remove or reduce harmful gases and particulate matter in the exhaust. For example, a diesel engine can be equipped with a diesel oxidation catalyst (DOC) that promotes oxidation of unburnt fuel, carbon monoxide and/or nitrous oxide, and a diesel particulate filter (DPF) that traps particulate matter. Over time, the increasing volume of trapped soot impedes the flow of exhaust through the DPF and degrades engine performance. One commonly used technique for in-situ cleaning or regeneration of a DPF involves raising the temperature of the DPF above a combustion or oxidation threshold of the soot particles accumulated on the DPF. In most cases, this is achieved by heating the exhaust before it enters the DPF. When the hot exhaust interacts with the soot particles, they oxidize.

The temperature of exhaust flowing through a DPF can be raised in many ways. For example, engine operating parameters such as the fuel-air mixture composition or engine load can be varied to produce exhaust having a higher temperature. Alternatively, fuel can be injected directly into the exhaust and oxidized in the presence of the DOC at a location upstream of the DPF to raise the temperature of the exhaust. In this arrangement, the DOC, together with the fuel injectors or dosers, acts as an exhaust heater.

A DOC typically becomes active, however, only above a threshold temperature, known as the DOC light-off temperature. When a temperature of the exhaust exceeds the DOC light-off temperature, the DOC promotes oxidation of fuel injected in the exhaust via an exothermic reaction. At low engine loads, however, the temperature of the exhaust may remain below the DOC light-off temperature. In such cases, to activate the DOC, it may be necessary to pre-heat the exhaust before it interacts with the DOC.

One attempt to address the problems described above is disclosed in U.S. Patent Application Publication No. 2011/0047973 of Wilhelm et al. published on Mar. 3, 2011 ("the '973 publication"). In particular, the '973 publication discloses a particulate trap regeneration system, which includes multiple after-treatment branches. Each after-treatment branch of the system of the '973 publication has a dedicated hydrocarbon doser and one or more particulate traps. In addition, the system of the '973 publication has a controller to control the amount and duration of fuel injection in each after-treatment branch. The system of the '973 publication also includes a regeneration event synchronization module to synchronize the regeneration events in the multiple after-treatment branches.

Although the system of the '973 publication discloses more than one doser, each after-treatment branch includes only one doser, which injects fuel at one location in the after-treatment branch. Because the system disclosed in the '973 publication utilizes a single doser that injects fuel in one location, the injected fuel may not mix well with the exhaust flowing in the associated after-treatment branch. Oxidation of the fuel in such a non-homogeneous mixture may cause non-uniform heating of the exhaust. The resulting temperature gradients may induce thermal stresses in the particulate filter and/or an associated oxidation catalyst, causing them to break or be damaged.

The exhaust system of the present disclosure solves one or more of the problems set forth above and/or other problems in the art.

SUMMARY

In one aspect, the present disclosure is directed to an exhaust system. The exhaust system may include a diffuser configured to receive exhaust from an engine. The exhaust system may further include a plurality of dosers associated with the diffuser and configured to inject fuel into the diffuser. The exhaust system may also include a controller configured to selectively control an amount of fuel injected by each of the plurality of dosers based on a velocity of the exhaust adjacent to each doser. In addition, the exhaust system may include an after-treatment component fluidly connected downstream of the diffuser and configured to heat the exhaust by oxidizing the injected fuel.

In another aspect, the present disclosure is directed to a method of heating exhaust. The method may include directing exhaust from an engine into a diffuser. The method may further include injecting fuel into the diffuser at a plurality of different locations. The method may also include heating the exhaust by oxidizing the injected fuel in an after-treatment component connected downstream of the diffuser.

DETAILED DESCRIPTION

Figure 1:
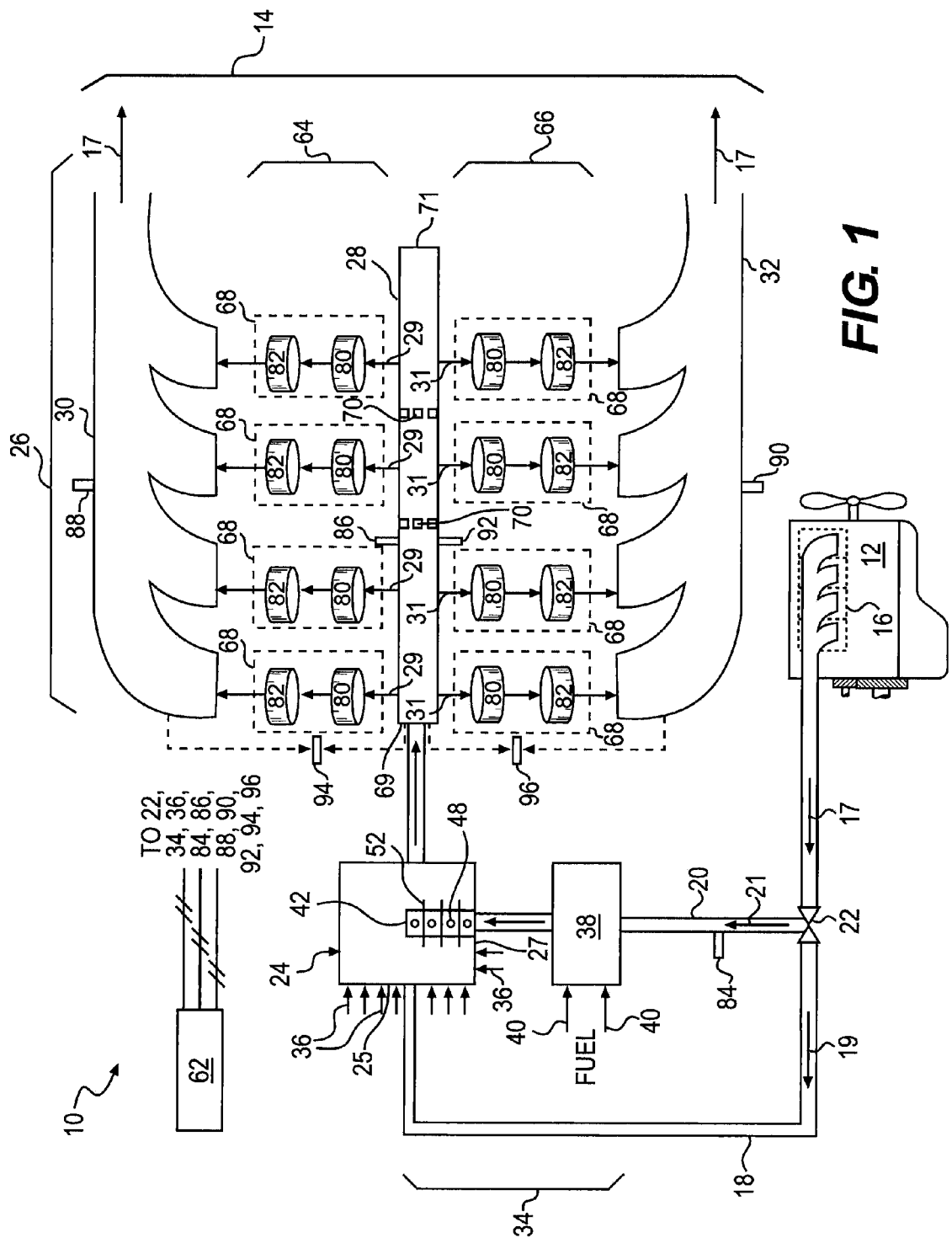
FIG. 1 is a schematic of an exemplary disclosed exhaust system.

FIG. 1 illustrates a machine 10 having an engine 12 and an exhaust system 14. Machine 10 may be a fixed or mobile machine that performs some type of operation associated with an industry such as railroad, marine, mining, construction, farming, power generation, or any other industry known in the art. For example, machine 10 may embody a locomotive, a marine vessel, an earth moving machine, a generator set, a pump, or another suitable operation-performing machine.

In one exemplary embodiment of machine 10, engine 12 may be a two-stroke diesel engine. One skilled in the art will recognize, however, that engine 12 may be any other type of internal combustion engine such as, for example, a four-stroke diesel engine, a gasoline engine, or a gaseous-fuel powered engine. Engine 12 may include an engine block that at least partially defines a plurality of cylinders 16. The plurality of cylinders 16 in engine 12 may be disposed in an "in-line" configuration, a "V" configuration, or in any other suitable configuration.

Engine 12 may be fluidly connected to an exhaust system 14. Exhaust system 14 may include multiple fluid paths that direct exhaust from cylinders 16 to the atmosphere. For example, exhaust system 14 may have a first conduit 18, which receives a first portion 19 of an exhaust flow 17 from engine 12, and a second conduit 20 that receives a remaining portion 21 of exhaust flow 17. In one exemplary embodiment, second conduit 20 may receive up to about 36% of the exhaust from engine 12. First and second conduits 18, 20 may connect to engine 12 via a valve 22. First and second conduits 18, 20 may discharge to a diffuser 24. An after-treatment component 26 may be fluidly connected downstream from diffuser 24. After-treatment component 26 may have a plenum 28, which may separate into two separate discharge passages 30 and 32, which discharge exhaust flow 17 to the atmosphere. Exhaust treatment components may be located between plenum 28 and discharge passages 30 and 32.

A pre-heater 34 may be disposed within or otherwise associated with second conduit 20. Pre-heater 34 may heat exhaust received by second conduit 20 from engine 12 and transfer the heated exhaust into diffuser 24. Diffuser 24 may have a primary inlet port connected to first conduit 18, and a secondary port that allows pre-heater 34 to fluidly communicate with diffuser 24. Diffuser 24 may also have one or more dosers 36 mounted on a diffuser wall 25 for injecting fuel into exhaust within diffuser 24.

Pre-heater 34 may have a heating portion 38 disposed outside diffuser 24 and a heater tube 42 disposed at least partially within diffuser 24. Heating portion 38 may be located upstream of heater tube 42. One or more fuel lines 40 may supply fuel to heating portion 38. Heating portion 38 may be a fuel-fired burner where fuel supplied by the one or more fuel lines 40 may burn and heat exhaust from second conduit 20 to a predetermined temperature. In one exemplary embodiment, the predetermined temperature may be about 600° C. Heater tube 42 may be fluidly connected to heating portion 38 and configured to transfer heated exhaust from heating portion 38 to diffuser 24. While within diffuser 24, heated exhaust from heater tube 42 may mix with and heat exhaust entering diffuser 24 from first conduit 18. Exhaust heated in this manner may pass into plenum 28 of after-treatment component 26.

Figure 2:
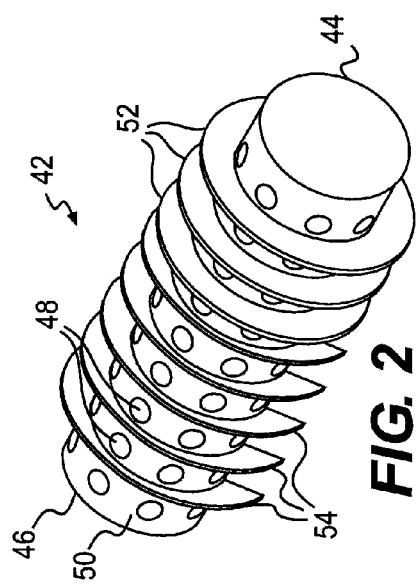
FIG. 2 is a pictorial illustration of an exemplary disclosed heater tube in the exhaust system of FIG. 1.

As shown in FIG. 2, heater tube 42 may have a open end 44 to receive heated exhaust from heating portion 38, and a closed end 46 located opposite open end 44. In addition, heater tube 42 may have one or more openings 48 to distribute the heated exhaust flow over a length of heater tube 42. Openings 48 may be located on an outer surface 50, which extends from open end 44 to closed end 46 of heater tube 42. In some exemplary embodiments, openings 48 may be located only on a portion of outer surface 50. Openings 48 located on different portions of outer surface 50 may have the same or different sizes. In one exemplary embodiment, openings 48 may be circular. It is contemplated that openings 48 located on different portions of outer surface 50 may have different shapes. For example, openings 48 may have an elliptical, rectangular, polygonal, or any other kind of appropriate shape. One skilled in the art would recognize, however, that manufacturing heater tube 42 with circular openings 48 of different sizes may be more economical as compared to a heater tube 42 having openings 48 of other shapes. Heated exhaust from heating portion 38 may come out of openings 48 on heater tube 42 and mix with exhaust from first conduit 18 in diffuser 24. Distributing the heated exhaust through openings 48 in this manner may promote heating of exhaust within diffuser 24 and plenum 28 to a generally uniform temperature.

An amount of exhaust coming out of each opening 48 may be the same or may be different. Moreover, because pressure may build up adjacent to closed end 46 of heater tube 42, more heated exhaust may be discharged from openings 48 adjacent to closed end 46 than from openings 48 located adjacent to open end 44. In one exemplary embodiment, sizes of openings 48 may be selected such that a generally equal amount of exhaust may be discharged from each opening 48. For example, a first opening 48 adjacent to open end 44 may be larger than a second opening 48 adjacent to closed end 46 to help balance the discharge from openings 48.

Exhaust flow in first conduit 18 and diffuser 24 may also be non-uniform because of the operation of various components in engine 12. For example, a velocity of exhaust in diffuser 24 may be higher adjacent to open end 44 of heater tube 42 compared to a velocity of exhaust adjacent to closed end 46 of heater tube 42. In one exemplary embodiment, different amounts of exhaust may be discharged from different openings 48, based on a velocity of exhaust adjacent to each opening 48. For example, more exhaust may be discharged from a first opening 48 compared to a second opening 48, when a velocity of exhaust adjacent to first opening 48 is higher than a velocity of exhaust adjacent to second opening 48. The higher velocity of exhaust near first opening 48 may induce additional turbulence in an exhaust flow in diffuser 24 and may promote improved mixing of heated exhaust exiting first opening 48 with exhaust in diffuser 24. In one exemplary embodiment, more exhaust may be discharged from first opening 48 by making a size of first opening 48 larger than a size of second opening 48.

As illustrated in FIG. 2, heater tube 42 may have one or more fins 52 attached to outer surface 50 to guide exhaust coming out of openings 48 towards a desired portion of diffuser 24 and plenum 28. Fins 52 may be generally circular radial fins and may be disposed generally orthogonal to outer surface 50. Circular radial fins may be preferable over other types of fins because they may be amenable to relatively simple and economical manufacturing methods. It is contemplated, however, that heater tube 42 may alternatively or additionally have fins 54, which may not circumscribe the outer surface 50 of heater tube 42. Fins 54 may instead be attached to outer surface 50 over less than an entire circumference of heater tube 42. As shown in FIG. 3A, a portion of the circumference of heater tube 42 spanning an angle θ may remain un-finned. One skilled in the art would recognize that only some portions of fins 52 may transfer heat efficiently to the exhaust in diffuser 24 because of changes in a velocity of exhaust as it flows around heater tube 42. It may, therefore, be possible to select θ so that fins 54 correspond to the most thermally efficient portions of fins 52. Thus, fins 54 may provide cost savings by requiring less material for manufacture compared to fins 52 while transferring approximately the same amount of heat as fins 52. In one exemplary embodiment, angle θ may range from about 0° to 180°. Further the un-finned portion of heater tube 42 may not have any openings, preventing heated exhaust from flowing out of the un-finned portion of heater tube 42.

Figure 3B:
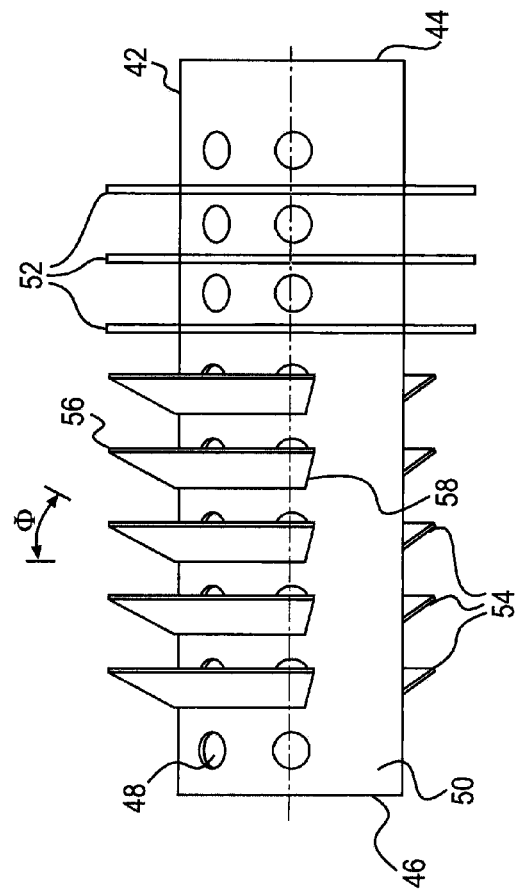
FIGS. 3A and 3B are additional pictorial illustrations of the heater tube of FIG. 2.
Figure 3A:

As further illustrated in FIGS. 3A and 3B, fins 54 may be angled. For example, fins 54 may be disposed at an angle φ relative to a plane orthogonal to a longitudinal axis of heater tube 42. It is contemplated that different fins 54 may be disposed at the same or different angles φ. It is also contemplated that the angle φ for a fin 54 may be different at different circumferential locations of fin tip 56. In certain exemplary embodiments, angle φ may range from −45° to 45°. Although angle φ has been described here with respect to fins 54, one skilled in the art would recognize that fins 52 may also be disposed at an angle φ in the same manner as fins 54.

Angling fins 52, 54 may allow the heated exhaust leaving openings 48 to be directed to a desired portion of diffuser 24 and plenum 28 and may promote mixing of the heated exhaust coming out of openings 48 with exhaust from first conduit 18. As discussed previously, the velocity of exhaust entering diffuser 24 may be non-uniform. As a result, some fins 52, 54 may be exposed to exhaust flowing at a relatively higher velocity compared to other fins 52, 54, which may be exposed to exhaust flowing at a relatively lower velocity. A first angle φ may be selected for fins 52, 54 exposed to exhaust at a relatively higher velocity such that the higher velocity exhaust is directed towards portions of diffuser 24 and plenum 28 where exhaust has a relatively lower velocity. Similarly, a second angle φ may be selected for fins 52, 54 exposed to exhaust at a relatively lower velocity such that the lower velocity exhaust is directed towards portions of diffuser 24 and plenum 28 where exhaust has a relatively higher velocity. First angle φ may be the same or different compared to second angle φ. Different angles φ may also be selected for fins 52, 54 at different circumferential locations to account for variations in exhaust velocity adjacent to the different circumferential locations. Selecting angles φ for fins 52, 54 in this manner may help ensure that the exhaust flowing in diffuser 24 mixes well with the heated exhaust exiting openings 48 so that exhaust in diffuser 24 and plenum 28 may have a generally uniform velocity and temperature over a cross-section of diffuser 24 and plenum 28.

In addition to directing exhaust to desired portions of diffuser 24 and plenum 28, fins 52, 54, and 60 may also conduct heat from heater tube 42 to the exhaust in diffuser 24. Specifically, fins 52, 54, 58 may be conductively connected to heater tube 42 and may be fabricated from a thermally conductive material such as aluminum, copper, or stainless steel. As exhaust flows through heater tube 42, heat from the exhaust may be conductively transferred through fins 52, 54, 60 to exhaust in diffuser 24. A temperature and flow rate of exhaust in heater tube 42 and exhaust in diffuser 24 may affect the magnitude of heat transfer therebetween.

Each of fins 52 and/or 54 may have about the same thickness or, alternatively may have different thicknesses. For example, fins 52, 54 exposed to exhaust flowing at a relatively higher velocity may have a larger thickness compared to fins 52, 54 exposed to exhaust flowing at a relatively lower velocity. The larger thickness for fins 52, 54 exposed to exhaust flowing at a higher velocity may improve transfer of heat from fins 52, 54 to exhaust in diffuser 24. Further, although FIGS. 3A and 3B illustrate fins 52, 54 having a generally rectangular cross-sectional profile, fins 52, 54 may alternatively have any appropriate cross-sectional profile known in the art. For example, fins 52, 54 may have a triangular cross-sectional profile with a larger thickness at fin base 58 and a smaller thickness at fin tip 56. In addition, although FIGS. 3A and 3B show heater tube 42 as having both types of fins 52 and 54, one skilled in the art would recognize that heater tube 42 may alternatively have fins of only one type.

Figure 4:
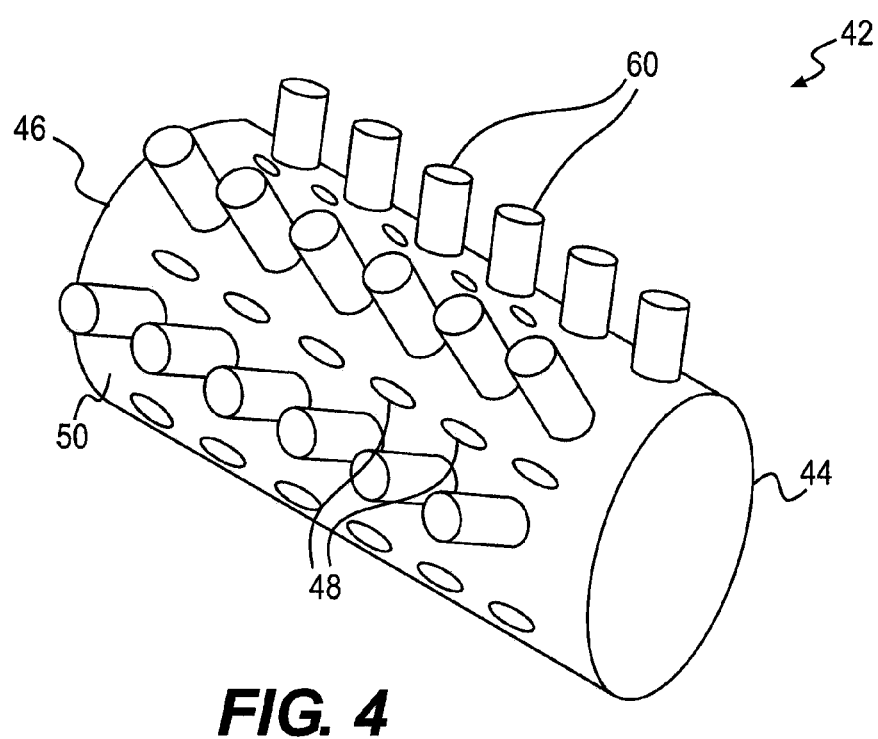
FIG. 4 is a pictorial illustration of another exemplary disclosed heater tube in the exhaust system of FIG. 1.

As illustrated in FIG. 4, heater tube 42 may have other types of fins, for example, pin fins 60. In certain embodiments, pin fins 60 may transfer heat from heater tube 42 to the exhaust in diffuser 24 more efficiently relative to fins 52, 54 because pin fins 60 may induce more turbulence in the exhaust flow compared to fins 52, 54. In one exemplary embodiment pin fins 60 may have a generally circular cross-section. One skilled in the art would recognize, however, that pin fins 60 may have any other shape or cross-sectional profile known in the art.

Returning to FIG. 1, a length of heater tube 42 may be equal to or less than a width of diffuser 24. In some exemplary embodiments, a relatively larger amount of exhaust may flow through a first portion of diffuser 24 while a relatively smaller amount of exhaust may flow through the remaining portion. In this case, it may be more efficient to discharge the heated exhaust from heater tube 42 in the first portion of diffuser 24. Heater tube 42 may, therefore, have a length which is smaller than a width of the diffuser but which is sufficiently large to discharge heated exhaust into the first portion of diffuser 24. As described above, fins 52, 54, 60 on heater tube 42 may be arranged so that exhaust in the first portion of diffuser 24 mixes well both with the exhaust in the remaining portion of diffuser 24 and with the heated exhaust exiting openings 48.

A plurality of dosers 36 may be disposed at various locations along a width of diffuser 24. In one exemplary embodiment, there may be 8 dosers disposed along the width of diffuser 24. For example, the 8 dosers may be located equidistant from each other and may be disposed across the entire width of the diffuser. In another exemplary embodiment, dosers 36 may be disposed over only a portion of the width of diffuser 24. In yet another exemplary embodiment, at least one doser 36 may be disposed on a side wall 27 of diffuser 24. Dosers 36 may be used to inject fuel into diffuser 24. The fuel injected by dosers 36 may oxidize in after-treatment component 26 to heat exhaust in plenum 28. In this manner, dosers 36 together with after-treatment component 26 may function as a primary exhaust heater. Dosers 36 may inject fuel upstream of heater tube 42 so that the injected fuel has sufficient time to vaporize and mix with exhaust in diffuser 24 and plenum 28 before the exhaust reaches exhaust treatment devices located in after-treatment component 26. The fuel injected by dosers 36 may be the same fuel that is used by engine 12 and pre-heater 34, or any other type of fuel that can be oxidized to produce heat.

An amount of fuel injected by each doser 36 may be the same or different and may be a function of engine load and a location of individual dosers 36. A controller 62 may monitor the load on engine 12 and determine an amount of fuel that must be injected by each doser 36 to raise a temperature of exhaust sufficiently to oxidize soot particles trapped in after-treatment component 26. In one exemplary embodiment, controller 62 may direct a first doser 36 to inject more fuel compared to a second doser 36 when a velocity of exhaust adjacent to first doser 36 exceeds the velocity of exhaust adjacent to second doser 36. In another exemplary embodiment, the amount of fuel injected by a doser 36 may range from about 3970 g/hr to 23000 g/hr.

Referring to FIG. 1, exhaust treatment devices located between plenum 28 and discharge passages 30, 32 may include, among other things, a first filter bank 64 and a second filter bank 66. First and second filter banks 64, 66 may each include at one or more filter assemblies 68. Although FIG. 1 illustrates an exemplary embodiment with four filter assemblies in each of the first and second filter banks 64, 66, one skilled in the art would understand that first and second filter banks 64, 66 may have any number of filter assemblies 68. A first portion 29 of exhaust in plenum 28 may pass through filter assemblies 68 in first filter bank 64, while a second portion 31 of the exhaust in plenum 28 may pass through filter assemblies 68 in second filter bank 66.

In one exemplary embodiment, filter assemblies 68 may be oriented such that a direction of exhaust flows 29 and 31 through filter assemblies 68 may be generally orthogonal to a direction of exhaust flows entering and exiting after-treatment component 26. A velocity of exhaust in plenum 28 may be relatively high, even at low engine loads, making it difficult for exhaust in plenum 28 to turn and enter filter assemblies 68. Thus, if left unchecked, more exhaust may enter filter assemblies 68 located near closed end 71 of plenum 28 as compared to filter assemblies 68 located closer to open end 69. To help balance exhaust flow through each filter assembly 68, one or more distribution devices 70 may be used to slow down and direct exhaust in plenum 28 to filter assemblies 68. As illustrated in FIG. 1, several such distribution devices 70 may be arranged in plenum 28. In one exemplary embodiment, a distribution device 70 may be a plate. One skilled in the art would recognize, however, that distribution devices may take other forms, for example, a cone, a semi-sphere, two or more angled plates, or a wire mesh screen.

Figure 5A:
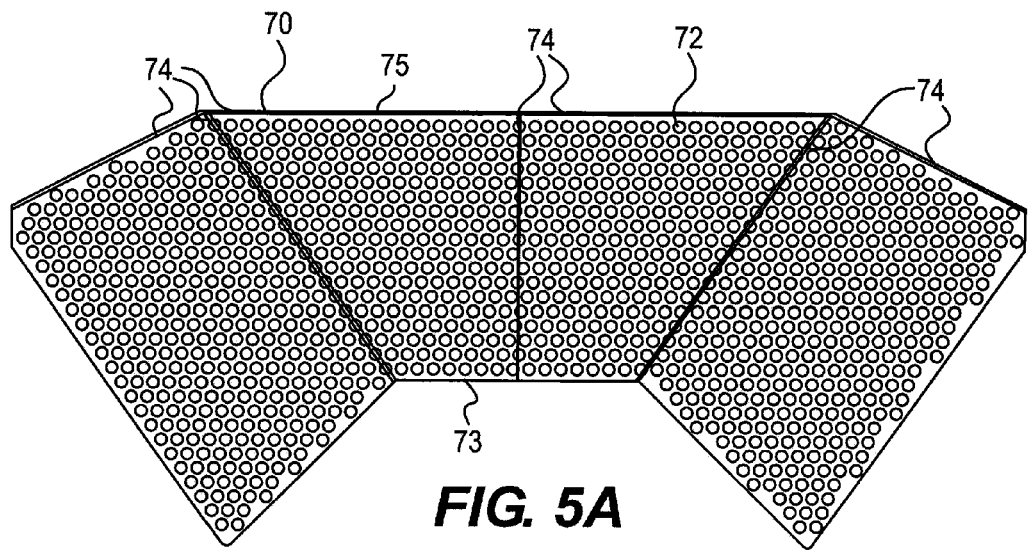
FIGS. 5A and 5B are pictorial illustrations of exemplary disclosed distribution devices in the exhaust system of FIG. 1.
Figure 5B:
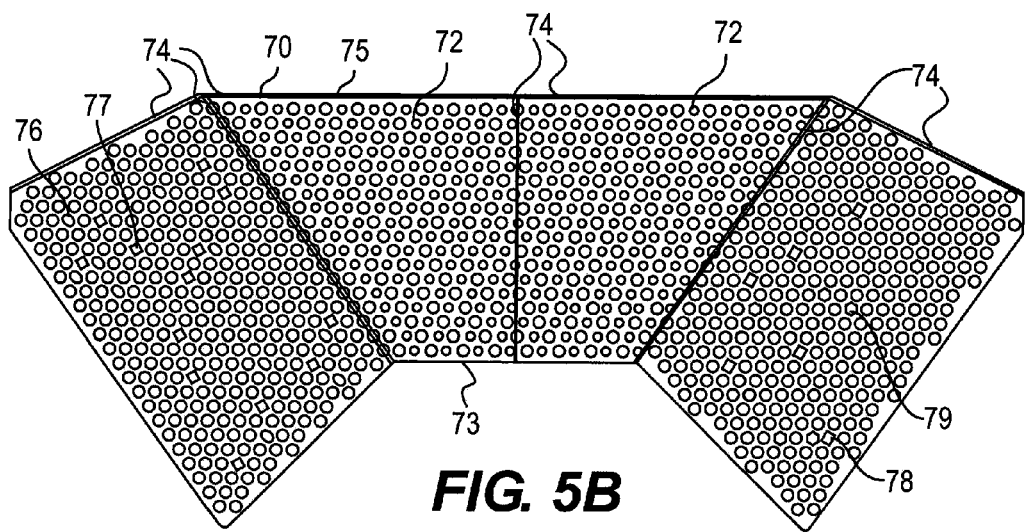

FIGS. 5A and 5B illustrate exemplary embodiments of distribution devices 70. Each distribution device 70 may have a plurality of perforations 72 to allow exhaust to pass through. A porosity of each distribution device 70 located in plenum 28 may be the same or different. The porosity of a distribution device 70 may be calculated as a ratio of the open area through which exhaust can flow across distribution device 70, to the overall cross-sectional area of distribution device 70. In another exemplary embodiment, the porosity of distribution device 70 may range from about 45% to 75%.

It may be necessary to select a location and porosity of each distribution device 70 to help ensure that exhaust in plenum 28 is distributed nearly uniformly to each filter assembly 68 in first and second filter banks 64, 66. For example, when a distribution device 70 is located too close to open end 69, filter assemblies 68 located upstream from distribution device 70 may receive exhaust from plenum 28, but filter assemblies 68 located downstream from distribution device 70 may be starved of exhaust. Similarly, when distribution device 70 has a low porosity, distribution device 70 may impede flow of exhaust in plenum 28 and filter assemblies 68 downstream from distribution device 70 may be starved of exhaust. Thus, it may be necessary to select both the location and porosity of each distribution device 70 to help ensure that each filter assembly 68 in plenum 28 receives a generally equal amount of exhaust flow. In one exemplary embodiment, a first distribution device 70 may be placed at a first distance from open end 69, which is at least one third of a length of plenum 28. Placing the first distribution device 70 at this location may help ensure that filter assemblies both upstream and downstream from the distribution device 70 receive sufficient exhaust. In another exemplary embodiment, distribution devices 70 with higher porosity may be placed nearer to open end 69, while distribution devices 70 with lower porosity may be placed nearer to closed end 71 of plenum 28.

As seen in FIGS. 5A and 5B, perforations 72 may be spaced apart from each other and may be generally circular. Circular perforations may not only be relatively easier to manufacture, but may also make it possible to fabricate distribution devices 70 having relatively high porosities. For example, perforations 72 may be arranged in a square-shaped, a triangular-shaped, or a polygonal-shaped array on distribution device 70 to achieve a desired porosity. In one exemplary embodiment, a diameter of perforations 72 may range from about 12 mm to 25 mm. Although FIG. 5A illustrates circular perforations 72, as illustrated in FIG. 5B, it is contemplated that perforations 72 in distribution device 70 may alternatively be elliptical (76), square (77), slot-shaped (78), polygonal (79), or may have any other appropriate shape known in the art. As further illustrated in FIG. 5B, it is also contemplated that distribution device 70 may have perforations of different shapes and sizes in different portions of the device.

Distribution device 70 may be fabricated via a laser-cutting procedure from stainless steel or another appropriate material capable of withstanding the high temperature of exhaust in plenum 28. As discussed above, exhaust velocities in plenum 28 may be very high. Given the high porosity of some exemplary distribution devices 70, it may be necessary to strengthen distribution devices 70 to prevent them from deforming, moving, or breaking when subjected to the high exhaust velocities during operation of exhaust system 14. Stiffening members 74 may be used to provide additional structural support to distribution devices 70. Stiffening members 74 may consist of rectangular metal sheets attached generally orthogonal to distribution devices 70. In one exemplary embodiment, stiffening members 74 may be rectangular steel sheets about 1 inch in height and about ⅛ inches thick. Stiffening members 74 may be attached on the upstream or downstream side of a distribution device 70. As illustrated in FIGS. 5A and 5B, stiffening members 74 may be attached along top edge 75 of a distribution device 70. A stiffening member 74 may also be attached vertically between a bottom edge 73 and a top edge 75 of a distribution device 70. Additional stiffening members 74 may be attached at oblique angles between bottom edge 73 and top edge 75 of distribution device 70. Stiffening members 74 may be attached to distribution devices 70 by welding. One skilled in the art would recognize, however, that stiffening members 74 may be attached to distribution devices 70 using any other attachment method known in the art.

Returning to FIG. 1, each filter assembly 68 may include a diesel oxidation catalyst (DOC) 80 and a diesel particulate filter (DPF) 82. DOC 80 may be located upstream from DPF 82. DOC 80 may help to oxidize fuel injected into the exhaust by dosers 36, when a temperature of DOC 80 exceeds a first threshold temperature, also known as the light-off temperature. Temperature of DOC 80 may be raised above the light-off temperature by exhaust in plenum 28. Fuel injected into the exhaust by dosers 36 may oxidize in the presence of DOC 80 via an exothermic reaction, the heat released by which may further heat the exhaust before it enters DPF 82. In one exemplary embodiment the first threshold temperature or the light-off temperature may be about 240° C. to 280° C.

DPF 82 may trap particulate matter as exhaust passes through DPF 82. Over time, DPF 82 may become overloaded with trapped soot, which may impede the flow of exhaust through DPF 82. DPF 82 may be cleaned by raising the temperature of DPF 82 above the combustion or oxidation threshold of the accumulated soot. One way of raising the temperature of DPF 82 may include heating exhaust upstream from DPF 82 by oxidizing fuel in the presence of DOC 80. Soot trapped in DPF 82 may oxidize when the temperature of exhaust passing through DPF 82 exceeds a second threshold temperature, also known as regeneration temperature, which may be the oxidation threshold for soot. In one exemplary embodiment, the second threshold temperature or the regeneration temperature may be about 500° C. to 650° C.

DOC 80 may include a flow-through substrate having, for example, a honeycomb structure with many parallel channels for the exhaust flows 29 or 31 to flow through. A catalytic coating (for example, of a platinum group metal) may be applied to the surface of the substrate to promote oxidation of some constituents (such as, for example, hydrocarbons, carbon monoxide, oxides of nitrogen, etc.) of exhaust as it flows through DOC 80. The honeycomb structure of the substrate in DOC 80 may increase the contact area of the substrate to exhaust, allowing more of the undesirable constituents to be oxidized as exhaust passes through DOC 80.

DPF 82 may be a device used to physically separate soot or particulate matter from an exhaust flow. DPF 82 may include a wall-flow substrate. Exhaust may pass through walls of DPF 82, leaving larger particulate matter accumulated on the walls. As is known in the art, DPF 82 may be regenerated periodically to clear the accumulated particulate matter.

Valve 22 may be selectively activated by controller 62, when necessary, to direct the first portion of exhaust from engine 12 into first conduit 18. Valve 22 may be any type of valve known in the art such as, for example, a flapper valve, a butterfly valve, a diaphragm valve, a gate valve, a ball valve, a poppet valve, or a globe valve. In addition, valve 22 may be solenoid-actuated, hydraulically-actuated, pneumatically-actuated or actuated in any other manner to selectively restrict or completely block the flow of exhaust through second conduit 20. For example, when DPFs 82 require cleaning and a temperature of exhaust in plenum 28 is below the light-off temperature of DOCs 80, controller 62 may open valve 22 to divert some exhaust from engine 12 to second conduit 20. Controller 62 may also activate pre-heater 34 to heat exhaust within second conduit 20. When the temperature of exhaust in plenum 28 exceeds the light-off temperature, controller 62 may adjust valve 22 to reduce the amount of exhaust entering second conduit 20. Controller 62 may also deactivate pre-heater 34.

Exhaust system 14 may include multiple sensors configured to detect operating parameters of exhaust system 14. The sensors may include, for example, a temperature sensor 84 to determine the temperature of exhaust in second conduit 20 before the exhaust enters pre-heater 34, and a temperature sensor 86 to determine the temperature of exhaust in plenum 28. Exhaust system 14 may also include additional temperature sensors 88 and 90 to determine temperatures of exhaust in discharge passages 30 and 32, respectively. In addition, exhaust system 14 may include a soot sensor 92 to determine an amount of soot accumulated in DPF 82. Further, exhaust system 14 may include differential pressure sensors 94 and 96 to determine pressure drops across first filter bank 64 and second filter bank 66, respectively. One skilled in the art would appreciate that FIG. 1 illustrates exemplary locations for sensors 84, 86, 88, 90, 92, 94, and 96 and that these sensors may be located at other appropriate locations in exhaust system 14. Signals generated by sensors 84, 86, 88, 90, 92, 94, and 96 may be directed to controller 62 for further processing.

Controller 62 may embody a single microprocessor or multiple microprocessors, field programmable gate arrays (FPGAs), digital signal processors (DSPs), etc. that include a means for controlling an operation of exhaust system 14 in response to signals received from the various sensors. Numerous commercially available microprocessors can be configured to perform the functions of controller 62. One skilled in the art would appreciate that controller 62 could readily embody a microprocessor separate from that controlling other non-exhaust related functions, or that controller 62 could be integral with a general engine control system microprocessor and be capable of controlling numerous engine system functions and modes of operation. If separate from a general engine control system microprocessor, controller 62 may communicate with the general engine control system microprocessor via data links or other methods. Various other known circuits may be associated with controller 62, including power supply circuitry, signal-conditioning circuitry, actuator driver circuitry (i.e., circuitry powering solenoids, motors, or piezo actuators), communication circuitry, and other appropriate circuitry.

Controller 62 may be configured to regulate operation of exhaust system 14 in response to monitored parameters of exhaust system 14. For example, controller 62 may cause valve 22 to direct a desired amount of exhaust from engine 12 into second conduit 20 based on the signals received from one or more of sensors 84, 86, 88, 90, 92, 94, and 96. In addition, controller 62 may also be configured to regulate operation of pre-heater 34. For example, when regeneration of DPFs 82 is desired, controller 62 may cause fuel to flow through fuel lines 40 and activate pre-heater 34 Further, controller 62 may adjust control valve 22 and the fuel flow to pre-heater 34 to control an amount of heating provided by pre-heater 34. Controller 62 may also control an amount of fuel injected by each doser 36 after the temperature of exhaust in plenum 28 is at or above the light-off temperature.

Figure 6:
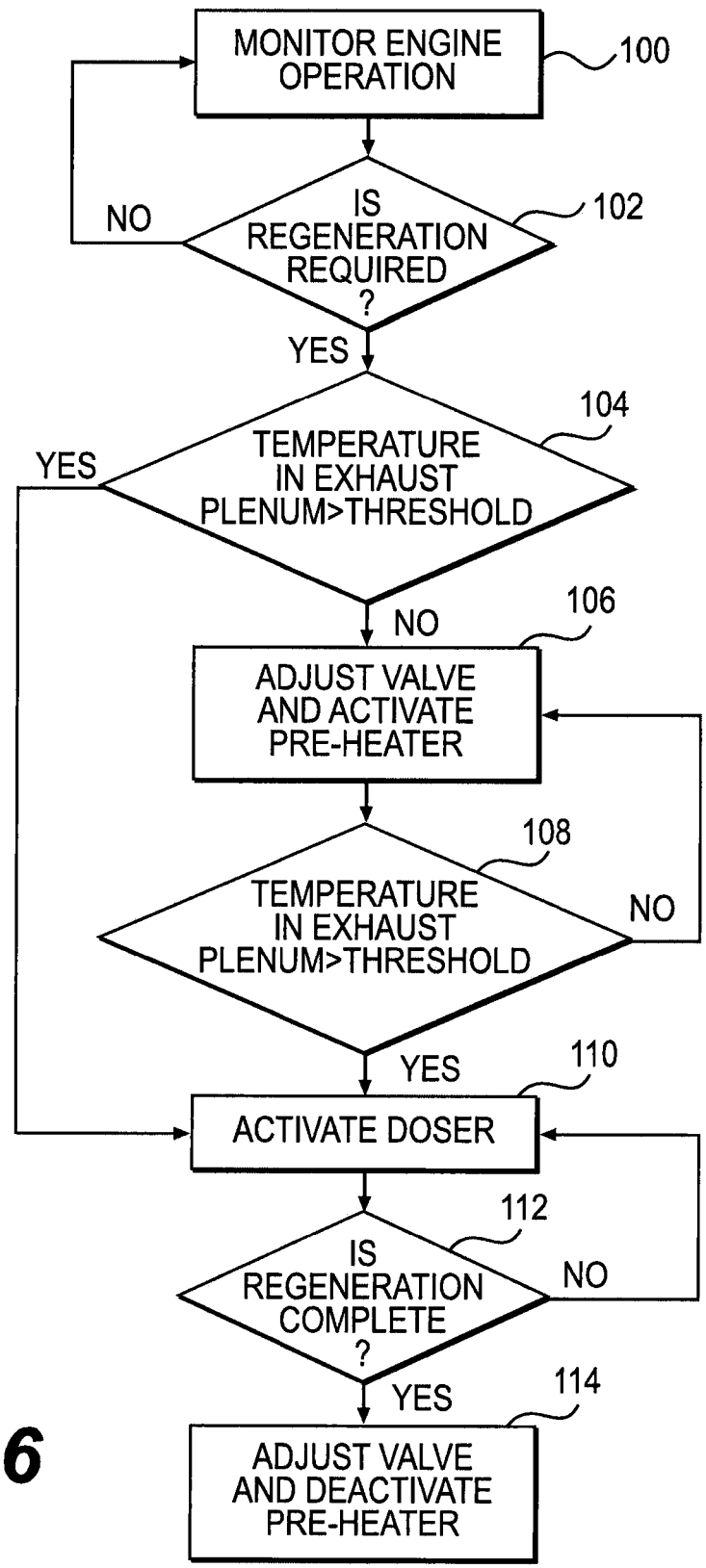
FIG. 6 is a flow chart illustrating an exemplary disclosed method of regeneration performed by the exhaust system of FIG. 1.
Figure 7:
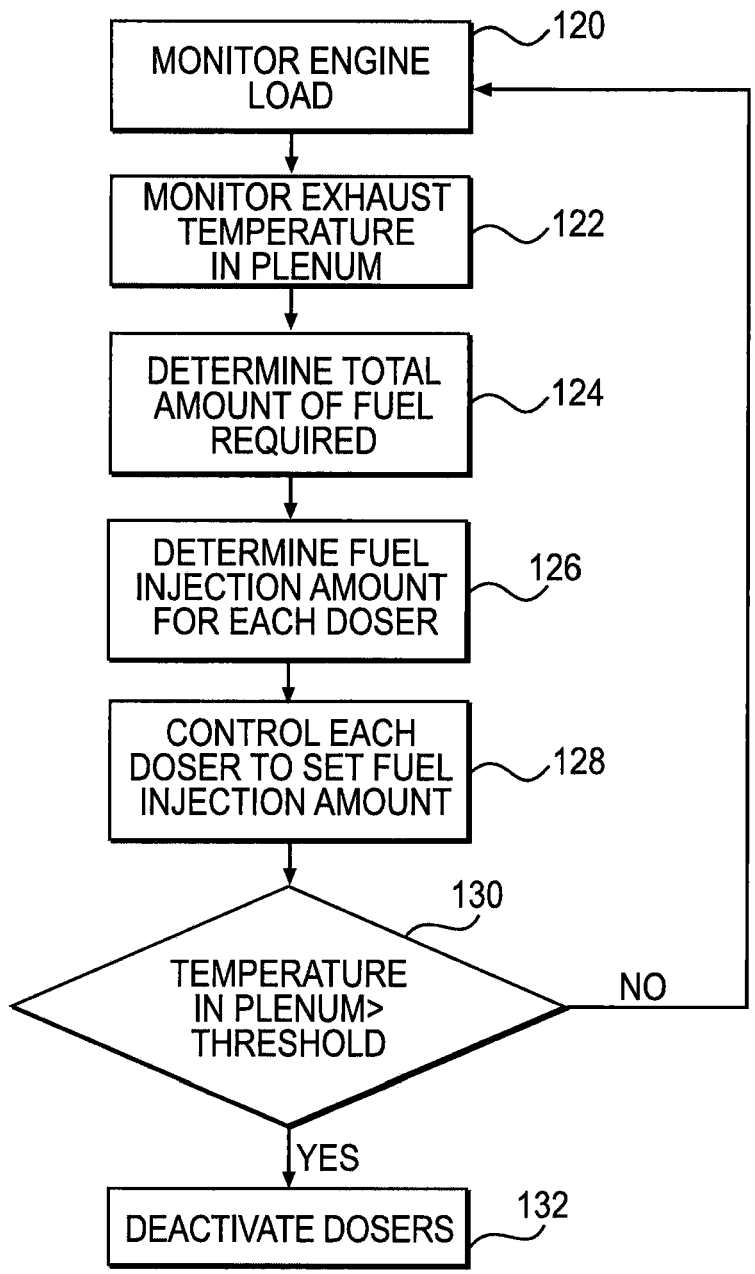
FIG. 7 is a flow chart illustrating an exemplary disclosed method of controlling fuel injection performed by the exhaust system of FIG. 1.

FIGS. 6 and 7 illustrate exemplary operations performed by controller 62 during regeneration operations of DPFs 82. FIGS. 6 and 7 will be discussed in more detail in the following section to further illustrate the disclosed concepts.

INDUSTRIAL APPLICABILITY

The disclosed exhaust system may be used in any machine or power system application where it is necessary to distribute exhaust from a plenum to multiple filter assemblies. One method of distributing the exhaust may be to use distribution devices that direct exhaust from the plenum to the multiple filter assemblies. In the disclosed embodiment, a series of distribution devices 70, each having perforations 72, may be arranged in plenum 28 to slow down and direct the exhaust to filter assemblies 68. The location and porosities of distribution devices 70 may be selected such that a nearly uniform amount of exhaust flows through each filter assembly 68. For example, a distribution device 70 with a relatively higher porosity may be placed closer to open end 69 so that exhaust flow in plenum 28 is not impeded and filter assemblies 68 downstream of distribution device 70 may receive sufficient exhaust. Similarly distribution device 70 may be placed at an optimum distance from open end 69 so that it does not impede a flow of exhaust in plenum 28 and allows filter assemblies 68 upstream and downstream from distribution device 70 to receive sufficient exhaust. Thus, the disclosed exhaust system may be able to distribute the exhaust uniformly to each filter assembly using a simple arrangement of distribution devices and without the need for additional flow control devices or sophisticated control systems.

The disclosed exhaust system may also allow for regeneration of the particulate filters in each of the multiple filter assemblies. One method of initiating regeneration may involve raising a temperature of exhaust flowing through the particulate filter above a combustion threshold of soot accumulated in the filter. The temperature of the exhaust may be raised by injecting fuel into the exhaust and oxidizing the fuel in the presence of an oxidation catalyst, located upstream of the particulate filter. The oxidation reaction may be exothermic and heat from the reaction may be used to heat the exhaust before it enters the particulate filter. Oxidation catalysts, however, may become active and promote the exothermic reaction only when the catalyst temperature is above the first threshold temperature or the light-off temperature. At low engine loads, the temperature of exhaust may be lower than the first threshold temperature. In the disclosed embodiment, pre-heater 34 may be used to pre-heat the exhaust to a temperature higher than the first threshold temperature before the exhaust can interact with DOCs 80. Operation of exhaust system 14 will now be described.

During operation of machine 10, soot may accumulate on DPFs 82 over an extended period of time, requiring regeneration of DPFs 82. As shown in FIG. 6, controller 62 may monitor operation of engine 12 (Step 100) and ascertain whether regeneration of DPFs 82 is required based on the monitored operation (Step 102).

Controller 62 may determine the need for regeneration of DPFs 82 in many ways. For example, in one embodiment, controller 62 may receive signals from differential pressure sensors 94 and 96, indicating that pressure drops across the first and second filter banks 64, 66 have exceeded a threshold pressure drop. A pressure drop higher than the threshold pressure drop may indicate that a predetermined amount of soot has accumulated in DPFs 82 and that regeneration of DPFs 82 would benefit performance of engine 12. In some exemplary embodiments, a back pressure sensor may be used to estimate an amount of soot accumulation. In another exemplary embodiment, controller 62 may determine that regeneration of DPFs 82 would be beneficial based on signals from soot sensor 92 indicating that an amount of soot accumulation on DPFs 82 has reached a soot accumulation threshold. In yet another exemplary embodiment, controller 62 may monitor engine operating parameters to determine an amount of soot that may be present in an exhaust flow from engine 12. Controller 62 may combine this information with a previously stored load history of engine 12 to determine whether regeneration of DPFs 82 may be required.

When controller 62 determines that regeneration of DPFs 82 is not required (Step 102, NO), controller 62 may continue to monitor the operation of engine 12. When controller 62 determines, however, that regeneration of DPFs 82 is required (Step 102, YES), controller 62 may receive a signal from temperature sensor 86 and determine whether a temperature of exhaust in plenum 28 is above a first threshold temperature or light-off temperature (Step 104). When controller 62 determines that the temperature of exhaust in plenum 28 is above the first threshold temperature (Step 104, YES), controller 62 may proceed to Step 110. When controller 62 determines, however, that the temperature of exhaust in plenum 28 is below the first threshold temperature (Step 104, NO), controller 62 may direct valve 22 to allow an increased portion of exhaust from engine 12 to flow through second conduit 20 (Step 106). Controller 62 may also initiate a flow of fuel through fuel lines 40 and activate pre-heater 34 to heat exhaust within second conduit 20 (Step 106).

At this point, the temperature of exhaust in plenum 28 is again considered. When the temperature of exhaust in plenum 28 is above the first threshold temperature (Step 108, YES), controller 62 may activate dosers 36 to inject fuel into diffuser 24 (Step 110). The injected fuel may oxidize in the presence of DOCs 80 and the accompanying exothermic reaction may heat exhaust in plenum 28. Controller 62 may control the amount and duration of fuel injection by dosers 36 to help ensure that the exhaust entering DPFs 82 is at a temperature higher than the second threshold temperature.

Controller 62 may monitor signals from sensors 84, 86, 88, 90, 92, 94, and 96 and determine whether regeneration is complete (Step 112). Controller 62 may determine that regeneration is complete in many ways. For example, in one embodiment, controller 62 may determine that regeneration is complete after the regeneration process has been active for a predetermined amount of time. In another exemplary embodiment controller 62 may determine that regeneration is complete when signals are received from differential pressure sensors 94 and 96 indicating that pressure drops across the first and second filter banks 64, 66 are below the threshold pressure drop. In yet another exemplary embodiment, controller 62 may determine that regeneration of DPFs 82 is complete based signals from soot sensor 92 indicating that an amount of soot accumulation on DPFs 82 is below the soot accumulation threshold.

As long as controller 62 determines that regeneration is not complete (Step 112, NO), controller 62 may continue the regeneration process and monitor sensors 84, 86, 88, 90, 92, 94, and 96. When controller 62 determines that regeneration is complete (Step 112, YES), controller 62 may adjust valve 22 to reduce the amount of exhaust flowing through second conduit 20. Controller 62 may also turn off fuel flow through fuel lines 40 and deactivate pre-heater 34 (Step 114). In addition, controller 62 may deactivate dosers 36.

Controller 62 may control an amount of fuel injected into diffuser 24 by each doser 36 as shown in FIG. 7. When controller 62 determines that dosers 36 must be activated, controller 62 may monitor the load on engine 12 (Step 120). Controller 62 may also monitor a temperature of exhaust in plenum 28 (Step 122). Based on the load on engine 12, controller may determine a flow rate of exhaust flowing through diffuser 24. Controller 62 may use the temperature of exhaust in plenum 28, the flow rate of exhaust, and a calorific value of fuel to determine a total amount of fuel injection that may be required to raise the temperature of exhaust in plenum 28 above the second threshold temperature, also known as the regeneration temperature (Step 124). For example, the total amount of fuel required may be determined using the following equation:

$$\dot{m}_{fuel}L = \dot{m}_{exhaust}C(T_{regeneration} - T_{exhaust}) \qquad (1)$$

where, $\dot{m}_{fuel}$ represents the total amount of fuel that may be required, L represents the calorific value of the fuel, $\dot{m}_{exhaust}$ represents a flow rate of exhaust in diffuser 24, C represents a specific heat of the exhaust, $T_{regeneration}$ represents the regeneration temperature, and $T_{exhaust}$ represents a temperature of exhaust in plenum 28.

Controller 62 may also determine an amount of fuel to be injected by each doser 36 based on the above parameters (Step 126). For example, based on the engine load, controller 62 may determine a velocity of exhaust adjacent to each doser 36. In one exemplary embodiment, controller 62 may determine the velocity of exhaust by measuring the velocity of exhaust adjacent to each doser 36. In another exemplary embodiment, controller 62 may retrieve the velocity of exhaust adjacent to each doser 36 from an on-board memory (not shown). The velocity values stored in the on-board memory may be derived from measurements or alternatively from simulations of exhaust flow in diffuser 24.

Controller 62 may use the ratios of velocities between dosers and the previously determined total amount of desired fuel injection to determine an amount of fuel that each doser 36 must inject into diffuser 24 (Step 126). For example, in an embodiment with two dosers, doser 1 and doser 2, when the ratio of the velocities of exhaust adjacent to the two dosers is r, an amount of fuel injected by doser 1 may be estimated using the following equation:

$$\dot{m}_{doser1} = \left(\frac{1}{r+1}\right)\dot{m}_{fuel}, \qquad (2)$$

while an amount of fuel injected by doser 2 may be estimated as follows:

$$\dot{m}_{doser2} = \left(\frac{1}{r+1}\right)\dot{m}_{fuel}, \quad (3)$$

where, $\dot{m}_{doser\ 1}$ and $\dot{m}_{doser\ 2}$ represent the amounts of fuel injected by doser 1 and doser 2, respectively. One skilled in the art would recognize, however, that controller 62 may use other algorithms or methods known in the art to divide a total amount of fuel between the plurality of dosers 36.

Controller 62 may selectively control each doser 36 to set a fuel injection amount for each doser (Step 128). In one exemplary embodiment, controller 62 may direct a first set of dosers to inject more fuel compared to a second set of dosers when a velocity of the exhaust adjacent to the first set of dosers exceeds a velocity of the exhaust adjacent to the second set of dosers. Moreover, by controlling each doser or sets of dosers to inject different amounts of fuel in different portions of diffuser 24 based on a local velocity of exhaust, controller 62 may help to ensure homogeneous mixing of fuel with exhaust in diffuser 24. Controller 62 may monitor the temperature of exhaust in plenum 28 (Step 130) and when controller 62 determines that the temperature of exhaust in plenum 28 is less than the second threshold temperature, controller 62 may return to step 120 (Step 130, NO). When controller 62 determines, however, that the temperature of exhaust in plenum 28 is higher than the second threshold temperature (Step 130, YES), controller 62 may deactivate dosers 36 (Step 132). In this manner, controller 62 may control an amount of fuel injected by each doser 36.

It will be apparent to those skilled in the art that various modifications and variations can be made to the disclosed exhaust system without departing from the scope of the disclosure. Other embodiments of the exhaust system will be apparent to those skilled in the art from consideration of the specification and practice of the exhaust system disclosed herein. It is intended that the specification and examples be considered as exemplary only, with a true scope of the disclosure being indicated by the following claims and their equivalents.

What is claimed is:

1. An exhaust system, comprising:
   a diffuser configured to receive exhaust from an engine;
   a plurality of dosers associated with the diffuser and configured to inject fuel into the diffuser;
   a plenum fluidly connected downstream of the diffuser;
   a controller configured to determine a temperature of exhaust in the plenum and selectively control an amount of fuel injected by each of the plurality of dosers based on the determined temperature and a velocity of the exhaust adjacent to each doser; and
   an aftertreatment component fluidly connected downstream of the plenum and configured to heat the exhaust by oxidizing the injected fuel.

2. The exhaust system of claim 1, wherein a number of the plurality of dosers is 8 and wherein the dosers are disposed equidistant from each other across a width of the diffuser.

3. The exhaust system of claim 1, wherein the plurality of dosers are distributed across a width of the diffuser.

4. The exhaust system of claim 3, wherein the plurality of dosers are distributed across a portion of the width of the diffuser, the portion being smaller than the width of the diffuser.

5. The exhaust system of claim 3, wherein one of the plurality of dosers is disposed on a side wall of the diffuser and the remaining dosers are distributed across the width of the diffuser.

6. The exhaust system of claim 5, wherein the controller is configured to activate the plurality of dosers when a temperature of exhaust in the after-treatment component is below a regeneration temperature.

7. The exhaust system of claim 6, wherein the controller is configured to determine a total amount of fuel required to raise the temperature of exhaust in the after-treatment component above the regeneration temperature based on a flow rate of exhaust in the diffuser.

8. The exhaust system of claim 7, wherein the controller is configured to determine an amount of fuel to be injected by each doser based on the relative velocities of the exhaust adjacent to each of the plurality of dosers.

9. The exhaust system of claim 8, wherein the controller is configured to direct a first doser selected from among the plurality of dosers to inject a different amount of fuel than a second doser selected from among the remaining plurality of dosers when a velocity of exhaust adjacent to the first doser is different from a velocity of exhaust adjacent to the second doser.

10. The exhaust system of claim 9, wherein the after-treatment component includes:
    a diesel oxidation catalyst configured to oxidize the injected fuel; and
    a diesel particulate filter located downstream of the diesel oxidation catalyst.

11. A method of heating exhaust, the method comprising:
    directing exhaust from an engine into a diffuser;
    injecting fuel into the diffuser using a plurality of dosers;
    directing the exhaust from the diffuser into a plenum;
    determining a temperature of exhaust in the plenum;
    selectively controlling, via a controller, an amount of fuel injected by each of the plurality of dosers based on the determined temperature and a velocity of the exhausted adjacent to each doser; and
    heating the exhaust by oxidizing the injected fuel in an after-treatment component connected downstream of the plenum.

12. The method of claim 11, further comprising:
    determining a flow rate of exhaust in the diffuser;
    determining a temperature of exhaust in the after-treatment component;
    determining a total amount of fuel required to raise the temperature of exhaust above a regeneration temperature based on the determined flow rate and the determined temperature; and
    injecting the determined total amount of fuel.

13. The method of claim 12, further comprising:
    determining relative amounts of fuel to be injected using each doser based on the determined velocity and the total amount of fuel required.

14. The method of claim 13, wherein injecting includes injecting more fuel using a first doser at a first location than using a second doser at a second location.

15. The method of claim 14, wherein heating includes:
    oxidizing the injected fuel in the presence of a diesel oxidation catalyst; and
    heating the exhaust using heat generated during oxidation of the injected fuel.

16. The method of claim 15, further including:
    determining a temperature of exhaust in the after-treatment component after injecting fuel into the diffuser; and halting fuel injection when the temperature of exhaust in the after-treatment component is above the regeneration temperature.

17. A machine, comprising:
an engine having a plurality of cylinders;
a diffuser configured to receive exhaust from the plurality of cylinders;
a plurality of dosers configured to inject fuel into the diffuser;
a plenum fluidly connected downstream of the diffuser;
a temperature sensor configured to determine a temperature of exhaust in the plenum;
a controller configured to selectively control an amount of fuel injected by each of the plurality of dosers based on the determined temperature and a velocity of exhaust adjacent to each closer; and
an after-treatment component fluidly connected downstream of the diffuser and configured to heat the exhaust by oxidizing the injected fuel.

18. The machine of claim 17, wherein the plurality of dosers are disposed across a width of the diffuser.

19. The machine of claim 18, wherein the controller is configured to determine a total amount of fuel required to raise the temperature of exhaust in the after-treatment component above the regeneration temperature based on a flow rate of exhaust in the diffuser.

20. The machine of claim 19, wherein the controller is configured to determine an amount of fuel to be injected by each doser based on the relative velocities of exhaust adjacent to each of the plurality of dosers.

* * * * *

UNITED STATES PATENT AND TRADEMARK OFFICE
CERTIFICATE OF CORRECTION

PATENT NO.       : 8,984,868 B2
APPLICATION NO.  : 13/465584
DATED            : March 24, 2015
INVENTOR(S)      : Patel et al.

Page 1 of 1

It is certified that error appears in the above-identified patent and that said Letters Patent is hereby corrected as shown below:

Column 13, line 56, In claim 1, delete "aftertreatment" and insert -- after-treatment --.

Column 14, line 39, In claim 11, delete "exhausted" and insert -- exhaust --.

Signed and Sealed this
Twenty-third Day of August, 2016

Michelle K. Lee
*Director of the United States Patent and Trademark Office*